(12) United States Patent
Masaki et al.

(10) Patent No.: US 10,212,473 B2
(45) Date of Patent: *Feb. 19, 2019

(54) PORTABLE INFORMATION PROCESSING DEVICE AND MEDIA DATA REPLAY SYSTEM

(71) Applicant: Funai Electric Co., Ltd., Daito-shi, Osaka (JP)

(72) Inventors: Yasuo Masaki, Daito (JP); Sei Kohno, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 40 days.

This patent is subject to a terminal disclaimer.

(21) Appl. No.: 15/166,813

(22) Filed: May 27, 2016

(65) Prior Publication Data

US 2016/0277789 A1    Sep. 22, 2016

Related U.S. Application Data

(63) Continuation of application No. 13/520,652, filed as application No. PCT/JP2010/073562 on Dec. 27, 2010, now Pat. No. 9,357,257.

(30) Foreign Application Priority Data

Jan. 5, 2010  (JP) ................. 2010-000639

(51) Int. Cl.
*H04N 21/436*  (2011.01)
*H04N 21/41*  (2011.01)
(Continued)

(52) U.S. Cl.
CPC ... *H04N 21/43615* (2013.01); *H04N 21/4122* (2013.01); *H04N 21/4126* (2013.01);
(Continued)

(58) Field of Classification Search
CPC .......... H04L 21/4122; H04L 21/41407; H04L 21/43615; H04L 21/43635; H04L 21/4126;
(Continued)

(56) References Cited

U.S. PATENT DOCUMENTS 7,627,343 B2  12/2009 Fadell et al.
7,751,853 B2  7/2010 Fadell et al.
(Continued)

FOREIGN PATENT DOCUMENTS

JP   2000-236469 A   8/2000
JP   2006-524877 A   11/2006
(Continued)

OTHER PUBLICATIONS

Hisato Shima, "DLNA Standard and Trends of Practical Realization", The Journal of the Institute of Image Information and Television Engineers, pp. 901-905, Jul. 1, 2009, vol. 63, No. 7.
(Continued)

*Primary Examiner* — Alina A Boutah
(74) *Attorney, Agent, or Firm* — Crowell & Moring LLP (57) ABSTRACT

A portable information processing device (1) is provided with a communication portion (12) capable of communication according to a prescribed network standard allowing sharing of media data between corresponding apparatuses connected to a network, a built-in display portion (10) capable of replaying/displaying the media data, a control unit (18a) capable of controlling a display on the built-in display portion and acquiring the media data, and a first external display (15) noncorresponding to the prescribed network standard.

13 Claims, 5 Drawing Sheets

(51) Int. Cl.
  *H04N 21/414* (2011.01)
  *H04N 21/4363* (2011.01)
  *H04N 21/422* (2011.01)
  *H04N 21/433* (2011.01)
  *H04N 21/472* (2011.01)
  *H04N 21/61* (2011.01)

(52) U.S. Cl.
  CPC . *H04N 21/41407* (2013.01); *H04N 21/42208* (2013.01); *H04N 21/42219* (2013.01); *H04N 21/42224* (2013.01); *H04N 21/4334* (2013.01); *H04N 21/43635* (2013.01); *H04N 21/47217* (2013.01); *H04N 21/6125* (2013.01)

(58) Field of Classification Search
  CPC ........... H04L 21/6125; H04L 21/47217; H04L 21/4334; H04L 21/42224; H04L 21/42219; H04L 21/42208
  USPC ....... 709/203, 218, 209, 213, 212, 219, 248; 345/156
  See application file for complete search history.

(56) References Cited

U.S. PATENT DOCUMENTS

| | | | |
|---|---|---|---|
| 7,783,070 B2 | 8/2010 | Fadell et al. | |
| 8,050,714 B2 | 11/2011 | Fadell et al. | |
| 8,078,224 B2 | 12/2011 | Fadell et al. | |
| 8,165,634 B2 | 4/2012 | Fadell et al. | |
| 8,190,205 B2 | 5/2012 | Fadell et al. | |
| 2006/0020962 A1* | 1/2006 | Stark | G06F 17/30861 725/32 |
| 2006/0263048 A1* | 11/2006 | Sato | H04N 21/42207 386/247 |
| 2008/0106513 A1* | 5/2008 | Morotomi | G06F 1/1624 345/156 |
| 2008/0125031 A1 | 5/2008 | Fadell et al. | |
| 2008/0151702 A1 | 6/2008 | Yuasa et al. | |
| 2008/0229370 A1* | 9/2008 | Zustak | H04L 12/2807 725/78 |
| 2008/0266248 A1* | 10/2008 | Kim | G06F 3/023 345/156 |
| 2008/0270562 A1* | 10/2008 | Jin | H04L 67/025 709/208 |
| 2008/0298305 A1* | 12/2008 | Nakamura | H04L 63/068 370/328 |
| 2008/0320543 A1* | 12/2008 | Wang | H04N 7/162 725/131 |
| 2009/0081950 A1* | 3/2009 | Matsubara | H04H 60/80 455/3.06 |
| 2009/0100460 A1* | 4/2009 | Hicks, III | H04H 20/106 725/35 |
| 2009/0100492 A1* | 4/2009 | Hicks, III | H04L 12/2825 725/127 |
| 2009/0109345 A1* | 4/2009 | Nori | H04L 12/2803 348/721 |
| 2009/0132923 A1* | 5/2009 | Han | H04L 12/282 715/717 |
| 2009/0141180 A1* | 6/2009 | Kondo | G09G 5/006 348/723 |
| 2009/0177971 A1* | 7/2009 | Kim | H04L 67/02 715/739 |
| 2009/0199239 A1* | 8/2009 | Chaki | H04H 60/80 725/39 |
| 2009/0248914 A1* | 10/2009 | Choi | H04N 5/765 710/33 |
| 2009/0262661 A1* | 10/2009 | Ueda | H04N 1/00294 370/254 |
| 2009/0268754 A1* | 10/2009 | Palm | H04L 67/2823 370/466 |
| 2009/0320073 A1* | 12/2009 | Reisman | G06F 17/30873 725/51 |
| 2010/0023599 A1* | 1/2010 | Azuma | H04N 5/4403 709/217 |
| 2010/0071015 A1* | 3/2010 | Tomioka | H04B 1/202 725/110 |
| 2010/0088733 A1* | 4/2010 | Chan | H04N 21/25808 725/80 |
| 2010/0110294 A1* | 5/2010 | Oka | H04N 5/44591 348/564 |
| 2010/0121900 A1* | 5/2010 | Sakai | H04L 12/2809 709/201 |
| 2010/0122177 A1 | 5/2010 | Yoshioka | |
| 2010/0129062 A1* | 5/2010 | Nakajima | H04N 5/46 386/241 |
| 2010/0201876 A1* | 8/2010 | Lin | H04N 21/43615 348/554 |
| 2010/0263006 A1* | 10/2010 | Matsuyama | H04N 21/4135 725/109 |
| 2010/0284669 A1* | 11/2010 | Sasaki | G06F 21/10 386/252 |
| 2010/0287480 A1* | 11/2010 | Hicks, III | H04L 12/2809 715/751 |
| 2010/0329339 A1* | 12/2010 | Kanagawa | G06F 3/1454 375/240.16 |
| 2010/0333036 A1* | 12/2010 | Matsuyama | H04N 5/44543 715/835 |
| 2011/0179104 A1* | 7/2011 | Hakoda | G11B 27/034 709/203 |
| 2012/0115414 A1 | 5/2012 | Fadell et al. | |

FOREIGN PATENT DOCUMENTS

| | | |
|---|---|---|
| JP | 2007-184745 A | 7/2007 |
| JP | 2007-306088 A | 11/2007 |
| JP | 2008-159139 A | 7/2008 |
| JP | 2008-288894 A | 11/2008 |
| JP | 2009-182802 A | 8/2009 |
| JP | 2009-252334 A | 10/2009 |
| WO | WO 2008/117586 A1 | 10/2008 |
| WO | WO 2009/145182 A1 | 12/2009 |

OTHER PUBLICATIONS

International Search Report dated Apr. 19, 2011 including English-language translation (Four (4) pages).
Extended European Search Report dated May 7, 2013 (nine (9) pages).
"Feature Article 1, Guide to Making the in-home LAN More Powerful, Part 5," PC Japan, Jul. 2008, vol. 13, No. 7, SB Creative Group, 13 pages (with partial English translation).
European Office Action dated Apr. 7, 2014 (4 pages).

* cited by examiner

PORTABLE INFORMATION PROCESSING DEVICE AND MEDIA DATA REPLAY SYSTEM

CROSS REFERENCE TO RELATED APPLICATIONS

This application is a continuation of U.S. application Ser. No. 13/520,652, filed Jul. 5, 2012, which is a National Stage application of PCT/JP2010/073562, filed Dec. 27, 2010, which claims priority from Japanese Patent application no. 2010-000639, the disclosures of which are expressly incorporated by reference herein.

TECHNICAL FIELD

The present invention relates to a portable information processing device and a media data replay system, and more particularly, it relates to a portable information processing device including a built-in display portion capable of replaying/displaying media data and a media data replay system including such a portable information processing device.

BACKGROUND TECHNIQUE

A portable information processing device including a built-in display portion capable of replaying/displaying media data is known in general. Such a portable information processing device is disclosed in Japanese Patent Laying-Open No. 2007-184745, for example.

In Japanese Patent Laying-Open No. 2007-184745, there is disclosed a remote controller (portable information processing device) corresponding to DLNA (Digital Living Network Alliance: registered trademark (prescribed network standard)). This remote controller has a built-in display portion, and is capable of displaying media data acquired from an apparatus or the like interconnected to a network according to DLNA on the built-in display portion. Although not clearly stated in the aforementioned Patent Document 1, it is conceivable that, in a case where an external display corresponding to DLNA is connected to the remote controller in the network, the remote controller is capable of controlling the external display to display media data in the network of DLNA.

PRIOR ART

Patent Document

Patent Document 1: Japanese Patent Laying-Open No. 2007-184745

SUMMARY OF THE INVENTION

Problems to be Solved by the Invention

However, while it is possible to control the external display corresponding to DLNA (prescribed network structure) to display the media data in the remote controller described in the aforementioned Japanese Patent Laying-Open No. 2007-184745, there is such an inconvenience that an external display not corresponding to DLNA cannot perform communication according to DLNA. In a case of employing an external display noncorresponding to DLNA, therefore, media data cannot be transmitted to the external display, and hence there is such a problem that the external display noncorresponding to DLNA cannot be controlled to display the media data.

The present invention has been proposed in order to solve the aforementioned problem, and an object of the present invention is to provide a portable information processing device capable of controlling an external display noncorresponding to a prescribed network standard allowing sharing of media data between corresponding apparatuses connected to a network to display the media data and a media data replay system including such a portable information processing device.

Means for Solving the Problems and Effects of the Invention

A portable information processing device according to a first aspect of the present invention includes a communication portion capable of communication according to a prescribed network standard allowing sharing of media data between corresponding apparatuses connected to a network, a built-in display portion capable of replaying/displaying the media data, a control portion capable of controlling a display on the built-in display portion and acquiring the media data and an external display connection portion connectable to a first external display noncorresponding to the prescribed network standard without through the network, while the communication portion is capable of communicating with a second external display as a corresponding apparatus corresponding to the prescribed network standard through the network, and the control portion is formed to be capable of acquiring the media data from a media server via the network at least through the communication portion and controlling, among the first external display, noncorresponding to the prescribed network standard, connected to the external display connection portion, the second external display as the corresponding apparatus and the built-in display portion, at least the first external display to replay/display the acquired media data.

As hereinabove described, the portable information processing device according to this first aspect is provided with the external display connection portion connectable to the first external display noncorresponding to the prescribed network standard allowing sharing of media data between the corresponding apparatuses connected to the network without through the network and controls the first external display, noncorresponding to the prescribed network standard, connected to the external display connection portion to replay/display the media data, whereby the same can control the first external display noncorresponding to the prescribed network standard to replay/display the media data by connecting the first external display noncorresponding to the prescribed network standard to the external display connection portion. Thus, also in a case of employing the first external display noncorresponding to the prescribed network standard not corresponding to the prescribed network standard and hence incapable of communication according to the prescribed network standard and incapable of acquiring the media data through the network, the first external display noncorresponding to the prescribed network standard can replay/display the media data. Further, the control portion acquires the media data from the media server via the network at least through the communication portion, whereby the same can easily acquire the media data from the media server through the network also with respect to the first external display noncorresponding to the prescribed network standard, and can control the first external display noncorresponding to the prescribed network standard to replay/display the media data.

Preferably in the aforementioned portable information processing device according to the first aspect, the control portion is formed to be capable of controlling the first external display, noncorresponding to the prescribed network standard, connected to the external display connection portion to replay/display the acquired media data and controlling the built-in display portion to display a display as an operation portion for controlling another apparatus to replay/display the acquired media data. When forming the portable information processing device in this manner, another apparatus can be operated with the portable information processing device also in a case of replaying/displaying the media data with the first external display noncorresponding to the prescribed network standard while controlling the built-in display to make the display as the operation portion for controlling another apparatus to replay/display the acquired media data, whereby user's labor of employing a separate device for operating the first external display can be omitted.

Preferably in this case, the control portion is formed to selectably list the media data on the built-in display portion, and formed to be capable of controlling the first external display, noncorresponding to the prescribed network standard, connected to the external display connection portion to replay/display media data selected by a user from the list. When forming the portable information processing device in this manner, the user can easily select media data from the listed media data and control the first external display noncorresponding to the prescribed network standard to replay/display the same.

Preferably in the aforementioned structure capable of the display as the operation portion for controlling another apparatus to replay/display the acquired media data, the control portion is formed to be capable of controlling the first external display, noncorresponding to the prescribed network standard, connected to the external display connection portion to replay/display the acquired media data and controlling the built-in display portion to make a display as a digital media controller. When forming the portable information processing device in this manner, an operational touch similar to that in a case of employing the portable information processing device as the digital media controller and controlling the external display corresponding to the prescribed network standard to replay/display the media data can be supplied to the user also in a case of employing the external display (first external display) noncorresponding to the prescribed network standard and controlling the same to replay/display the media data while controlling the built-in display portion to make the display as the digital media controller.

Preferably, the aforementioned portable information processing device according to the first aspect further includes a recording medium connection portion capable of connecting a portable recording medium in which media data is stored, the control portion is formed to be capable of acquiring the media data from the portable recording medium through the recording medium connection portion and controlling the first external display, noncorresponding to the prescribed network standard, connected to the external display connection portion to replay/display the acquired media data. When forming the portable information processing device in this manner, the first external display noncorresponding to the prescribed network standard can be controlled to replay/display the media data stored in the portable recording medium by connecting the portable recording medium to the recording medium connection portion.

Preferably, the aforementioned portable information processing device according to the first aspect further includes a built-in memory capable of storing media data, and the control portion is formed to be capable of acquiring the media data from the built-in memory and controlling the first external display, noncorresponding to the prescribed network standard, connected to the external display connection portion to replay/display the acquired media data. When forming the portable information processing device in this manner, the first external display noncorresponding to the prescribed network standard can be controlled to replay/display the media data stored in the built-in memory.

Preferably in the aforementioned portable information processing device according to the first aspect, the control portion is formed to be capable of controlling the built-in display portion to replay/display the acquired media data and controlling the first external display, noncorresponding to the prescribed network standard, connected to the external display connection portion to replay/display the same media data as the media data replayed/displayed by the built-in display portion. When forming the portable information processing device in this manner, the media data can be simultaneously replayed/displayed in both of the portable information processing device and the first external display.

Preferably in the aforementioned portable information processing device according to the first aspect, the communication portion is capable of communicating with the second external display as the corresponding apparatus corresponding to the prescribed network standard through the network, and the control portion is formed to control the second external display replaying/displaying media data to replay/display the media data of the media server and controlling the built-in display portion to display a display as an operation portion for controlling the second external display to replay/display the media data. When forming the portable information processing device in this manner, the second external display can be easily controlled to replay/display the media data in the network by employing the portable information processing device as the operation portion in a case where the second external display corresponding to the prescribed network standard is connected to the network.

Preferably in this case, the control portion is formed to be capable of controlling, as a digital media controller, the second external display as a digital media renderer to replay/display media data of a digital media server and controlling the built-in display portion to make a display as the digital media controller. When forming the portable information processing device in this manner, the control portion can control the second external display to replay/display the media data in the network while employing the portable information processing device as the digital media controller and controlling the built-in display to make the display as the digital media controller.

Preferably, the aforementioned portable information processing device according to the first aspect is formed to be connectable with the first external display connected without through the network according to a prescribed interface standard allowing transmission of sound data, image data and a control signal between apparatuses and allowing a link operation between the apparatuses. When forming the portable information processing device in this manner, not only the sound data and the image data but also the control signal or the like can be easily transmitted by connecting the connection portion of the portable information processing device and the first external display to each other through the prescribed interface standard, whereby the portable information processing device and the first external display noncorresponding to the prescribed network standard can be easily linked with each other.

Preferably in this case, the external display connection portion includes an HDMI connection portion HDMI-connectable with the first external display connected without through the network. When forming the portable information processing device in this manner, the first external display can be connected to the portable information processing device by HDMI connection having high versatility, whereby the portable information processing device and the first external display noncorresponding to the prescribed network standard can be more easily linked with each other.

Preferably in the aforementioned portable information processing device according to the first aspect, the communication portion is formed to be connectable to the Internet through a router as a corresponding apparatus corresponding to the prescribed network standard, and the control portion is formed to be capable of acquiring media data on the Internet through the communication portion and controlling the first external display, noncorresponding to the prescribed network standard, connected to the external display connection portion to replay/display the acquired media data. When forming the portable information processing device in this manner, the first external display noncorresponding to the prescribed network standard can be controlled to replay/display media data on the Internet through the router also in a case where the first external display noncorresponding to the prescribed network standard is not connected to the Internet.

Preferably in the aforementioned portable information processing device according to the first aspect, the control portion is so formed, in a case where the portable information processing device is connected to the first external display noncorresponding to the prescribed network standard through the external display connection portion, as to control the first external display to replay/display the acquired media data when controlling the first external display to replay/display the acquired media data. When forming the portable information processing device in this manner, the first external display can be controlled to display the acquired media data by simply connecting the first external display to the portable information processing device through the external display connection portion, whereby an operation burden on the user for controlling the first external display to display the media data can be reduced.

Preferably in this case, the control portion is formed to select the first external display as a replayer/displayer of the acquired media data on the basis of that the first external display noncorresponding to the prescribed network standard has been connected through the external display connection portion. When forming the portable information processing device in this manner, the first external display is automatically selected by the control portion as the replayer/displayer of the media data on the basis of that the first external display has been connected, whereby the user may not select the replayer/displayer, but an operation burden on the user can be reduced.

Preferably in the aforementioned portable information processing device according to the first aspect, the control portion is formed to be capable of accepting an instruction as to which one of the first external display noncorresponding to the prescribed network standard and the second external display as the corresponding apparatus corresponding to the prescribed network standard is to be controlled to replay/display the acquired media data from the user when controlling either external display to replay/display the media data. When forming the portable information processing device in this manner, the replayer/displayer can be selectively instructed by the user also in a case where the first external display is connected through the external display connection portion against the intention of the user, for example, whereby the replayer/displayer according to the intention of the user can be controlled to replay/display the media data.

A media data replay system according to a second aspect of the present invention includes a first external display noncorresponding to a prescribed network standard allowing sharing of media data between corresponding apparatuses connected to a network, a second external display as a corresponding apparatus corresponding to the prescribed network standard, a media server as a corresponding apparatus corresponding to the prescribed network standard and a portable information processing device, while the portable information processing device includes a communication portion capable of communication according to the prescribed network standard, a built-in display portion capable of replaying/displaying media data, a control portion capable of controlling a display on the built-in display portion and acquiring the media data and an external display connection portion connectable to the first external display noncorresponding to the prescribed network standard without through the network, the communication portion is capable of communicating with the second external display as the corresponding apparatus corresponding to the prescribed network standard through the network, and the control portion is formed to be capable of acquiring the media data from the media server via the network at least through the communication portion and controlling, among the first external display, noncorresponding to the prescribed network standard, connected to the external display connection portion, the second external display as the corresponding apparatus and the built-in display portion, at least the first external display to replay/display the acquired media data.

As hereinabove described, the media data replay system according to this second aspect is provided with the external display connection portion connectable to the first external display noncorresponding to the prescribed network standard allowing sharing of media data between the corresponding apparatuses connected to the network without through the network and controls the first external display, noncorresponding to the prescribed network standard, connected to the external display connection portion to replay/display the media data, whereby the same can control the first external display noncorresponding to the prescribed network standard to replay/display the media data by connecting the first external display noncorresponding to the prescribed network standard to the external display connection portion. Thus, also in a case of employing the first external display noncorresponding to the prescribed network standard not corresponding to the prescribed network standard and hence incapable of communication according to the prescribed network standard and incapable of acquiring the media data through the network, the first external display noncorresponding to the prescribed network standard can replay/display the media data. Further, the control portion acquires the media data from the media server via the network at least through the communication portion, whereby the same can easily acquire the media data from the media server through the network also with respect to the first external display noncorresponding to the prescribed network standard, and can control the first external display noncorresponding to the prescribed network standard to replay/display the media data.

Preferably in the aforementioned media data replay system according to the second aspect, the control portion is formed to be capable of controlling the first external display, noncorresponding to the prescribed network standard, connected to the external display connection portion to replay/display the acquired media data and controlling the built-in display portion to display a display as an operation portion for controlling another apparatus to replay/display the acquired media data. When forming the media data replay system in this manner, another apparatus can be operated with the portable information processing device also in a case of replaying/displaying the media data with the first external display noncorresponding to the prescribed network standard while controlling the built-in display to make the display as the operation portion for controlling another apparatus to replay/display the acquired media data, whereby user's labor of employing a separate device for operating the first external display can be omitted.

Preferably in the aforementioned media data replay system according to the second aspect, the portable information processing device further includes a recording medium connection portion capable of connecting a portable recording medium in which media data is stored, and the control portion is formed to be capable of acquiring the media data from the portable recording medium through the recording medium connection portion and controlling the first external display, noncorresponding to the prescribed network standard, connected to the external display connection portion to replay/display the acquired media data. When forming the media data replay system in this manner, the first external display noncorresponding to the prescribed network standard can be controlled to replay/display the media data stored in the portable recording medium by connecting the portable recording medium to the recording medium connection portion.

Preferably in the aforementioned media data replay system according to the second aspect, the portable information processing device further includes a built-in memory capable of storing media data, and the control portion is formed to be capable of acquiring the media data from the built-in memory and controlling the first external display, noncorresponding to the prescribed network standard, connected to the external display connection portion to replay/display the acquired media data. When forming the media data replay system in this manner, the first external display noncorresponding to the prescribed network standard can be controlled to replay/display the media data stored in the built-in memory.

Preferably in the aforementioned media data replay system according to the second aspect, the control portion is formed to be capable of controlling the built-in display portion to replay/display the acquired media data and controlling the first external display, noncorresponding to the prescribed network standard, connected to the external display connection portion to replay/display the same media data as the media data replayed/displayed by the built-in display portion. When forming the media data replay system in this manner, the media data can be simultaneously replayed/displayed in both of the portable information processing device and the first external display.

MODES FOR CARRYING OUT THE INVENTION

An embodiment embodying the present invention is now described on the basis of the drawings.

First, the structure of a home network system employing a portable information processing device 1 according to the embodiment of the present invention is described with reference to FIGS. 1 to 4.

Figure 1:
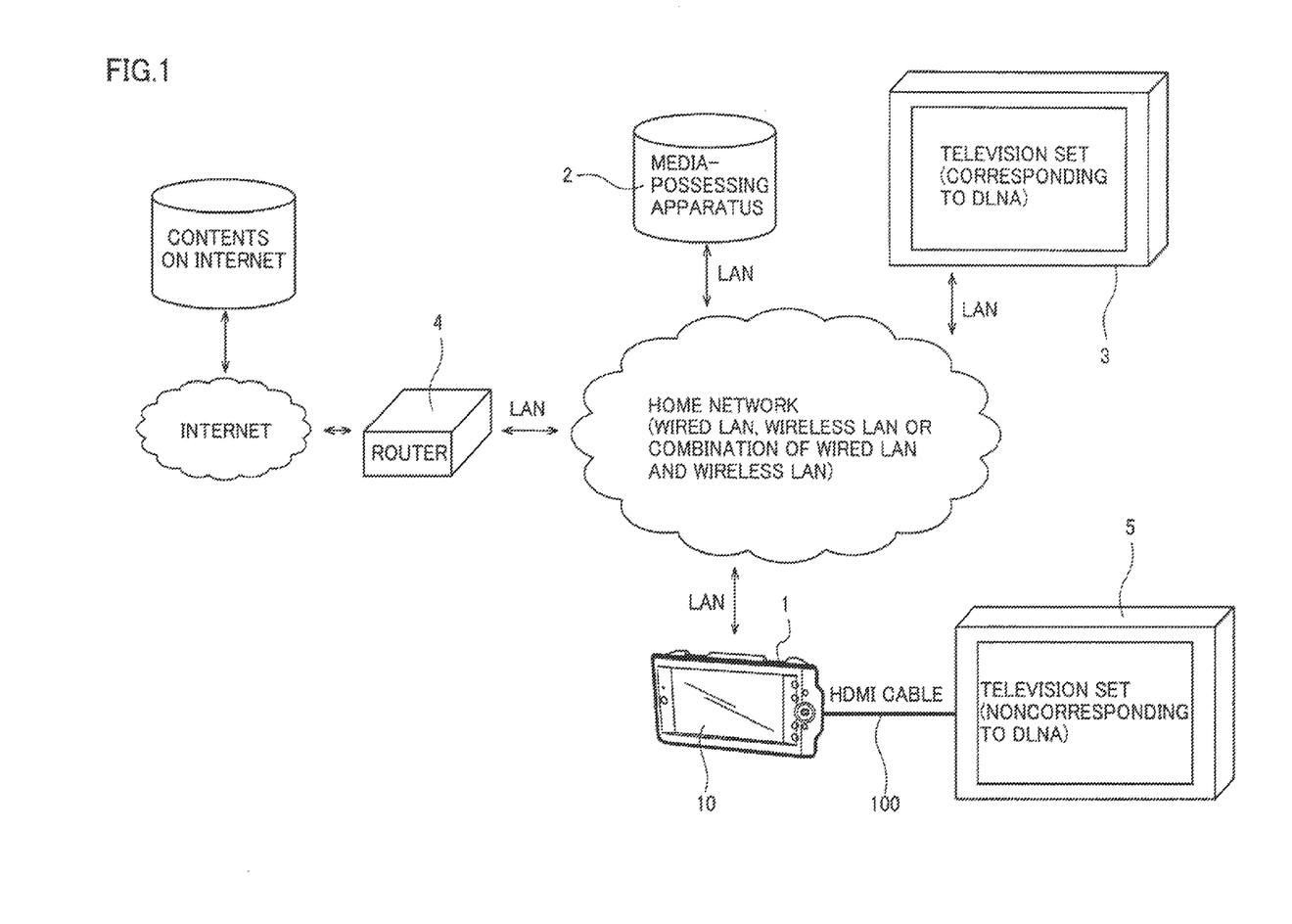
FIG. 1 A diagram showing the structure of a home network system employing a portable information processing device according to an embodiment of the present invention.

As shown in FIG. 1, various apparatuses including the portable information processing device 1 according to the embodiment of the present invention are interconnected with each other through a home network consisting of a wired LAN, a wireless LAN or a combination of these in this home network system. These apparatuses correspond to DLNA (Digital Living Network Alliance), and it is possible to mutually perform communication according to the DLNA standard between these apparatuses. DLNA is an example of the "prescribed network standard" in the present invention.

According to this embodiment, the portable information processing device 1, a media-possessing apparatus 2 possessing media data, a television set 3 capable of replaying/displaying media data related to contents such as pictures and images and a router 4 for connecting the home network system to the Internet are included as DLNA-corresponding apparatuses constituting the home network system. A DLNA-noncorresponding television set 5 is connected to the portable processing device 1 by an HDMI cable 100. The television set 3 is an example of the "second external display" in the present invention, and the television set 5 is an example of the "first external display" in the present invention. As the media-possessing apparatus 2, an apparatus such as a personal computer, a hard disk recorder or a digital camera possessing media data related to contents such as pictures and images is included. The home network system is so connected to the Internet through the router 4 that it is possible to acquire contents (media data) on the Internet.

A media data replay system according to the present invention includes the portable information processing device 1 which is the DLNA-corresponding apparatus included in the home network system, the media-possessing apparatus 2, the television set 3 and the router 4 as well as the DLNA-noncorresponding television set 5, not included in a home network system 21.

According to this embodiment, the portable information processing device 1 is formed to be capable of controlling the television set 5, noncorresponding to DLNA, HDMI-connected to the portable information processing device 1 to replay/display media data acquired from the media-possessing apparatus 2 which is the DLNA-corresponding apparatus through the home network by communication according to the DLNA standard. In this case, the portable information processing device 1 is formed to be capable of controlling a liquid crystal display portion 10 to display (mirror-display) the same media data as the television set 5, and also to be capable of making a display as a digital media controller described later on the liquid crystal display portion 10. Further, the portable information processing device 1 is formed to be capable of acquiring media data from a built-in memory (flash memory 18*b*) described later or an SD card 50 connected to an SD card connection portion 14 and controlling the DLNA-noncorresponding television set 5 to replay/display the media data. In addition, the portable information processing device 1 is also capable of controlling the television set 3 to replay/display the media data of the media-possessing apparatus 2 similarly to a normal DLNA-corresponding apparatus, and so formed that the display as the digital media controller is made on the liquid crystal display portion 10 in this case.

Functions of various DLNA-corresponding apparatuses in the home network according to DLNA are now described. The media-possessing apparatus 2 functions as a digital media server (hereinafter referred to as a DMS) as a supply source of media data in the home network. The television set 3 functions as a digital media renderer (hereinafter referred to as a DMR) as a display portion in the home network. The portable information processing device 1 functions as a digital media player (DMP) directly acquiring media data from the DMS and controlling the liquid crystal display portion 10 to replay/display the same, and functions as a digital media controller (DMC) controlling the digital media renderer (DMR) to display the media data acquired from the digital media server (DMS). According to this embodiment, the portable information processing device 1 is formed to pseudoly function as a DMC also with respect to the HDMI-connected DLNA-noncorresponding television set 5, in addition to the functions of the DMP and the DMC as the aforementioned normal DLNA-corresponding apparatuses. In other words, the portable information processing device 1 is capable of controlling the HDMI-connected DLNA-noncorresponding television set 5 to replay/display media data acquired from the DMS according to the DLNA standard and controlling the liquid crystal display portion 10 of the portable information processing device 1 to make the display as the DMC. In other words, the portable information processing device 1 is formed to be capable of controlling the liquid crystal display portion 10 to display a display as an operation portion for controlling another apparatus to replay/display the acquired media data.

As described above, the portable information processing device 1 according to this embodiment functions as the DMP, and functions also as the DMC, in response to the circumstances such as the location of media data to be replayed/displayed and a replayer/displayer thereof etc. The portable information processing device 1 is capable of replaying/displaying media data (contents) possessed by itself by a replaying/display function of itself also in a case where the same is not connected to the home network.

These DLNA-corresponding apparatuses mutually communicate with each other through the home network, and the portable information processing device 1 as the DMC or the DMP is capable of recognizing media data present in the DMS in the home network at any time. Further, the portable information processing device 1 is capable of recognizing media data possessed in the built-in memory (flash memory 18*b* described later) of itself and media data possessed by a recording medium (SD card 50 described later, a USB memory or the like). In other words, the portable information processing device 1 according to this embodiment recognizes all of media data accessible by itself at any time, and is capable of acquiring the media data through the home network or from the built-in memory (flash memory 18*b*) or the recording medium, and capable of replaying/displaying the same in itself or in the DMR in the home network or in the HDMI-connected external display (television set 5).

Further, the portable information processing device 1 according to this embodiment is formed to be Internet-connectable through the router 4 of the home network, and so formed that the user can use an electronic mail, a video chat, a voice chat and an IP telephone function etc. by performing the Internet connection. In addition, the portable information processing device 1 functions as a remote control of an audio apparatus (not shown) and is so formed that the user can use the portable information processing device 1 itself as an audiovisual apparatus (AV apparatus) also in a case of not performing the Internet connection.

Figure 2:
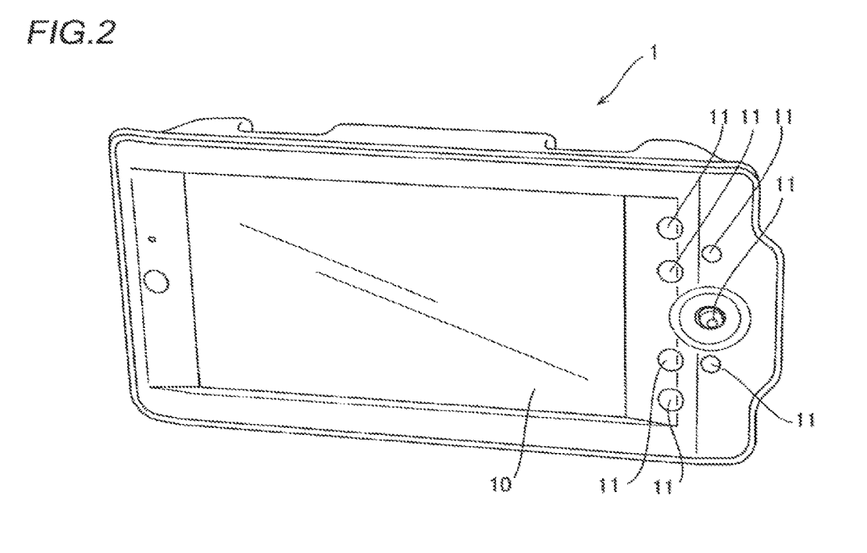
FIG. 2 A perspective view showing an overview of the portable information processing device according to the embodiment of the present invention.
Figure 3:
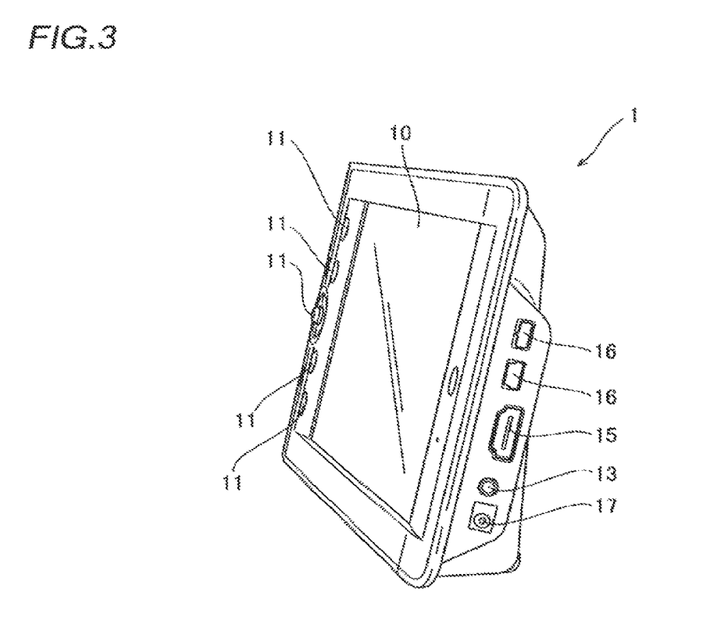
FIG. 3 A perspective view showing the overview of the portable information processing device according to the embodiment of the present invention.
Figure 4:
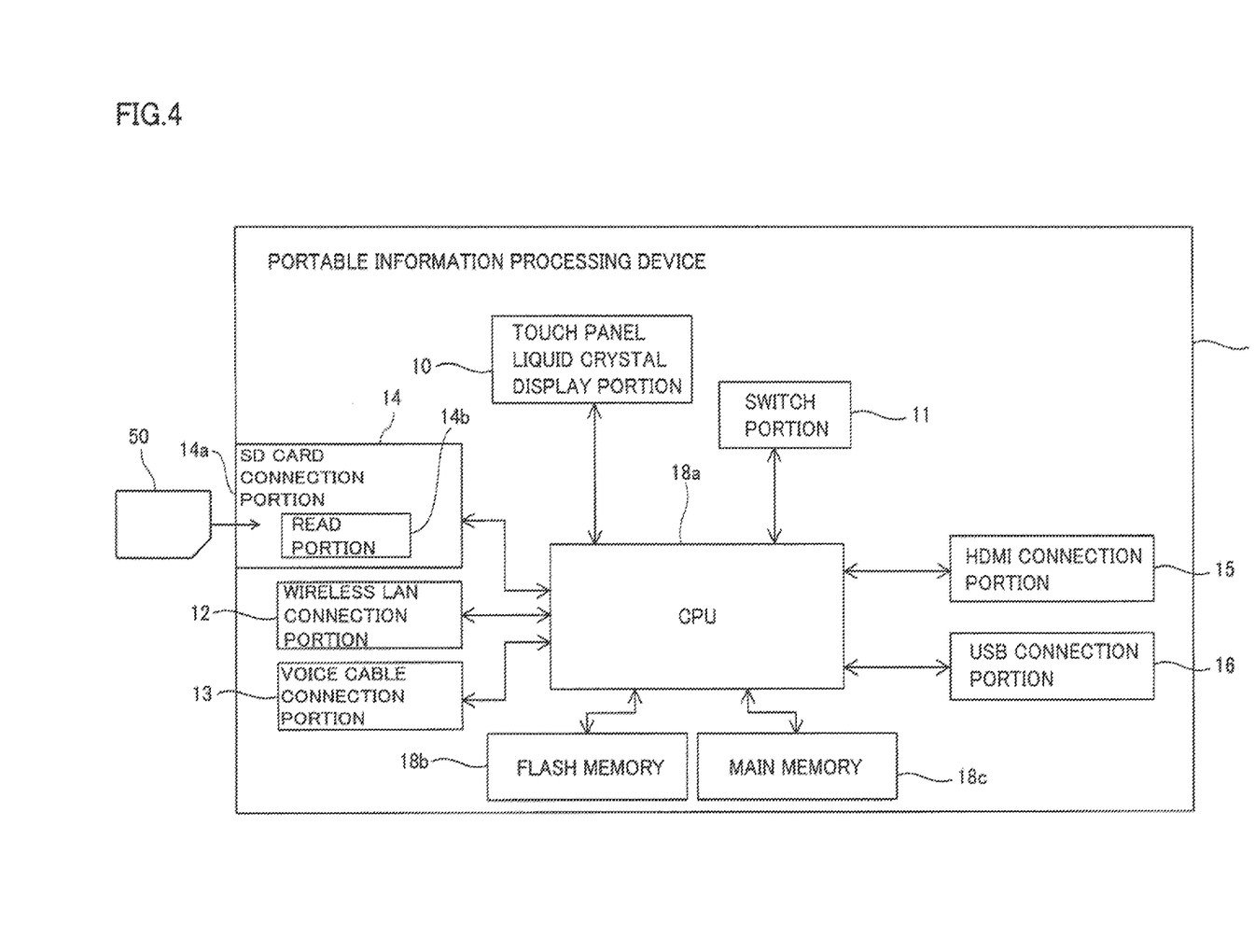
FIG. 4 A block diagram showing the structure of the portable information processing device according to the embodiment of the present invention.

The structure of the portable information processing device 1 according to this embodiment is now described. As shown in FIGS. 2 to 4, the portable information processing device 1 according to this embodiment includes the liquid crystal display portion 10 displaying information. The liquid crystal display portion 10 is an example of the "built-in display portion" in the present invention. The liquid crystal display portion 10 has a touch panel function as shown in FIG. 4, and is so formed that the user is capable of an operation according to an application by pressing operation buttons on a screen displayed on the liquid crystal display portion 10. Particularly according to this embodiment, the liquid crystal display portion 10 is so formed that all or part of media data (contents) accessible by the portable information processing device 1 are list-displayed on the liquid crystal display portion 10 by an operation of the user and that the user selects contents to be replayed/displayed from the list so that the contents are replayed/displayed on the liquid crystal display portion 10. In a case where there are a plurality of replayers/displayers (for example, the liquid crystal display portion 10 of the portable information processing device 1 and the television set 3 as the DMR etc.), the user is also capable of selecting the replayer/displayer (in the above example, the liquid crystal display portion 10 or the television set 3) of the contents by an operation of the touch panel in the portable information processing device 1. The portable information processing device 1 is so formed that, in a case where the television set 5 is HDMI-connected, contents are automatically replayed/displayed at least on the television set 5 regardless of whether or not to replay/display the contents on the liquid crystal display portion 10.

As shown in FIGS. 2 to 4, the portable information processing device 1 further includes a switch portion 11, a wireless LAN connection portion 12 (see FIG. 4), a voice cable connection portion 13, the SD card connection portion 14 (see FIG. 4), an HDMI connection portion 15, USB connection portions 16 and a power supply connector 17 (see FIG. 3).

The switch portion 11 is provided for performing an operation such as that of switching respective modes (a remote control mode, a media player mode etc.) of the portable information processing device 1. The wireless LAN connection portion 12 is provided for connecting the portable information processing device 1 to the home network. The wireless LAN connection portion 12 is an example of the "communication portion" in the present invention. The SD card connection portion 14 has a card slot 14a into which the SD card 50 is insertable, and a read portion 14b reading data such as media data stored in the SD card 50 inserted into the card slot 14a. The SD card connection portion 14 and the SD card 50 are examples of the "recording medium connection portion" and the "portable recording medium" in the present invention respectively.

The HDMI connection portion 15 is formed to be capable of transmitting images and sound data to the televisions set 5 noncorresponding to DLNA in a case where the portable information processing device 1 is connected to the television set 5 through the HDMI cable 100 (see FIG. 1). The HDMI connection portion 15 is an example of the "external display connection portion" in the present invention.

The two USB connection portions 16 are provided for connecting the portable information processing device 1 with an external memory (not shown) such as a USB memory or a hard disk through unshown USB cables, and the portable information processing device 1 is capable of reading data such as media data stored in the external memory. It is also possible to perform transmission/receiving of data between an external apparatus and the portable information processing device 1 by connecting the portable information processing device 1 to the external apparatus such as a personal computer with the USB connection portions 16. The USB connection portions 16 and the external memory such as the USB memory or the hard disk are examples of the "recording medium connection portion" and the "portable recording medium" in the present invention respectively. The voice cable connection portion 13 is so formed that an earphone (not shown) or a headphone (not shown) is connectable thereto. The power supply connector 17 is provided for incorporating power into the portable information processing device 1.

Further, the portable information processing device 1 includes a CPU 18a, the flash memory 18b and a main memory 18c. The CPU 18a is capable of reading programs stored in the flash memory 18b on the main memory 18c and running the same. Not only program data, but also media data etc. replayable/displayable on the liquid crystal display portion 10 are stored in the flash memory 18b. According to this embodiment, the CPU 18a is formed to perform control of recognizing accessible media data at any time and list-displaying the media data (contents) in response to an operation of the user, control of performing acquisition of the media data of the contents selected by the user and replay/display of the contents on the liquid crystal display portion 10, or control of performing transmission of the media data (contents) and a replaying/displaying instruction to another display/replay apparatus (the DLNA-corresponding television set 3 or the DLNA-noncorresponding television set 5). The CPU 18a is an example of the "control portion" in the present invention, and the flash memory 18b is an example of the "built-in memory" in the present invention.

Display modes related to replay/display of media data (contents) in the portable information processing device 1 according to this embodiment are now described with reference to FIGS. 5 to 8.

Figure 5:
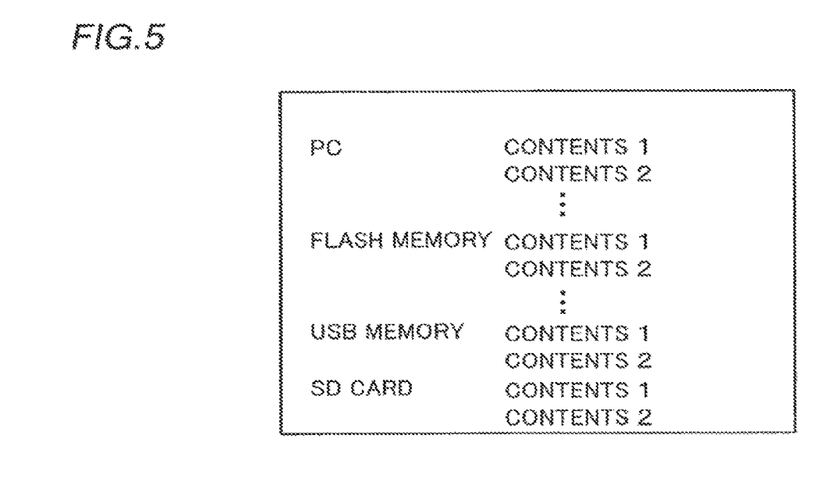
FIG. 5 A diagram for illustrating an example of a screen as a DMC displayed on a liquid crystal display portion of the portable information processing device according to the embodiment of the present invention.

The portable information processing device 1 is formed to recognize media data acquired through the home network, media data stored in the built-in memory (flash memory 18b) of the portable information processing device 1, media data stored in the external memory such as the hard disk connected to the USB connection portions 16 or media data stored in the SD card 50 connected to the SD card connection portion 14 at any time and to perform a display as the DMC related to the recognized media data on the liquid crystal display portion 10. As shown in FIG. 5, for example, the portable information processing device 1 is formed to be capable of list-displaying the recognized media data (contents) on the liquid crystal display portion 10. The user so selects contents to be replayed/displayed from among the contents list-displayed on the liquid crystal display portion 10 that it is possible to replay/display the selected contents on the portable information processing device 1. Further, the portable information processing device 1 is capable of controlling the liquid crystal display portion 10 of itself, the DLNA-corresponding televisions set 3 connected to the home network or the DLNA-noncorresponding television set 5 HDMI-connected to the portable information processing device 1 to replay/display the selected contents.

In the media data replay system employing the portable information processing device 1 according to this embodiment, it is possible to take a plurality of display modes by combining the list display (see FIG. 5) and replay/display of the contents in this portable information processing device 1 and replay/display of the contents in the external television set 3 or the television set 5. More specifically, the portable information processing device 1 is capable of taking a first display mode (display mode according to an original DLNA function) of employing the DLNA-corresponding television set 3 connected to the home network as the DMR, a second display mode (display mode according to a pseudo DLNA function) of employing the DLNA-noncorresponding television set 5 HDMI-connected to the portable information processing device 1 as a pseudo DMR, and a third display mode (display mode according to a mirror display function) of replaying/displaying the same contents as replayed/displayed contents in the portable information processing device 1 also on the DLNA-noncorresponding television set 5 HDMI-connected to the portable information processing device 1. The display modes are now described in detail.

Figure 6:
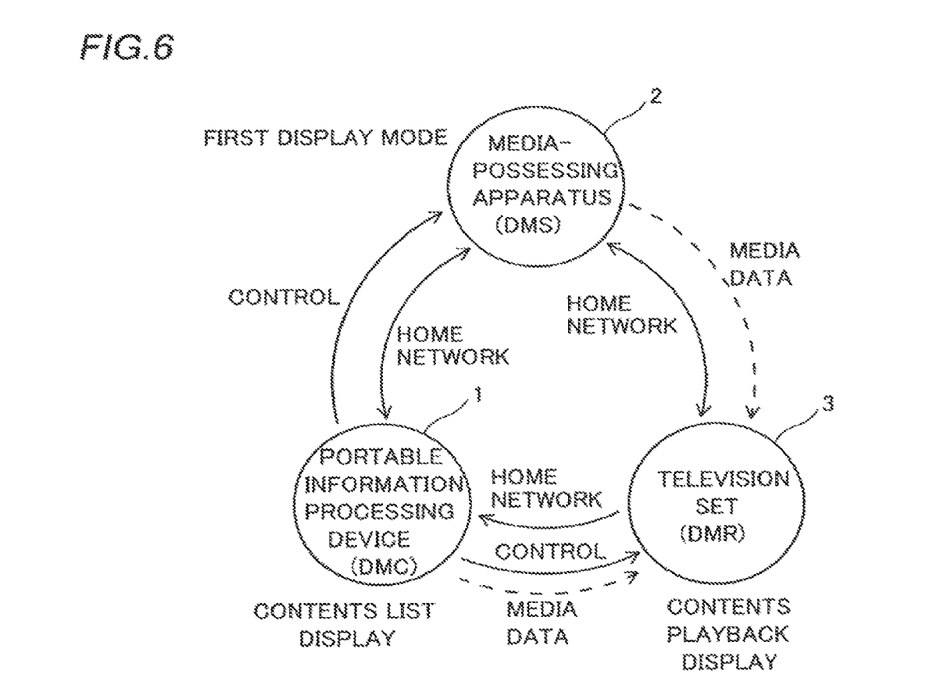
FIG. 6 A diagram for illustrating a display mode (first display mode) of the home network system shown in FIG. 1.

(First Display Mode According to Original DLNA Function)

As shown in FIG. 6, the first display mode is a display mode in a case where the DMR (digital media renderer) is present in the home network and the DMR (in a case where a plurality of DMRs are present, any one thereof) is selected as the replayer/displayer of the contents. In the first display mode, the portable information processing device 1 and the DLNA-corresponding television set 3 serve as the DMC (digital media controller) and the DMR respectively, and the media data is replayed/displayed on the DMR (according to this embodiment, the DLNA-corresponding television set 3) connected to the home network. In a case where the user selects media data in the media-possessing apparatus 2 as the DMS (digital media server) in this case, the portable information processing device 1 as the DMC controls the media-possessing apparatus 2 as the DMS and the television set 3 as the DMR to control the television set 3 to replay/display the media data of the DMS. In this case, the portable information processing device 1 merely outputs control instructions to the media-possessing apparatus 2 and the television set 3, and the media data itself is directly transmitted from the media-possessing apparatus 2 to the television set 3 without through the portable information processing device 1. In a case where the user selects media data (media data stored in the flash memory 18*b*, media data stored in the memory connected to the USB connection portions 16 or media data stored in the SD card 50 connected to the SD card connection portion 14) in the portable information processing device 1, the portable information processing device 1 transmits the selected media data to the television set 3 through the home network, and controls the television set 3 to replay/display the media data.

The portable information processing device 1 is so formed that, in this first display mode, a display as the DMC such as the list display of the contents is made on the liquid crystal display portion 10 of the portable information processing device 1 while replaying/displaying the contents on the television set 3.

Figure 7:
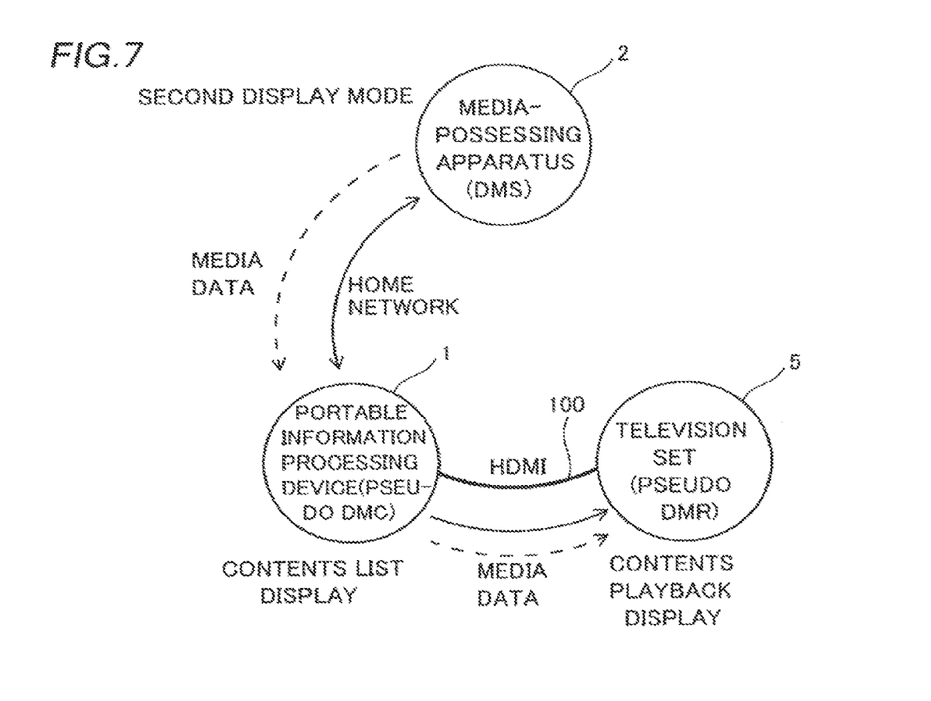
FIG. 7 A diagram for illustrating a display mode (second display mode) of the home network system shown in FIG. 1.

(Second Display Mode According to Pseudo DLNA Function)

As shown in FIG. 7, the second display mode is a display mode in a case where the DLNA-noncorresponding television set 5 is HDMI-connected to the portable information processing device 1 through the HDMI cable 100. In the second display mode, the television set 5 is decided the replayer/displayer for the contents at a point of time detecting that the television set 5 is HDMI-connected. In a case where the user selects contents in the portable information processing device 1 in this case, the contents are replayed/displayed on the television set 5. In a case where the user selects media data in the media-possessing apparatus 2, the media data cannot be directly transmitted from the media-possessing apparatus 2 to the television set 5 not connected to the home network, and hence the portable information processing device 1 acquires the selected media data from the media-possessing apparatus 2, transmits the acquired media data to the television set 5 through the HDMI cable 100, and controls the television set 5 to replay/display the media data (contents). In a case where the user selects media data in the portable information processing device 1, the portable information processing device 1 transmits the selected media data to the television set 5, and controls the television set 5 to replay/display the media data (contents).

The portable information processing device 1 is so formed that, also in this second display mode, a display as the DMC such as the list display of the contents is made on the liquid crystal display portion 10 of the portable information processing device 1 while replaying/displaying the contents on the television set 5. In either one of the first display mode and the second display mode, therefore, the display as the DMC (in the second display mode, the pseudo DMC which is not the original DMC) is made on the portable information processing device 1 while the contents selected by the user are replayed/displayed on the television set (the television set 3 as the DMR or the television set 5 as the pseudo DMR which is not the original DMR). In other words, usage touches (operation contents of the user on the portable information processing device 1 and operation results such as the replay/display according to the operation) of the user are identical in the first display mode of replaying/displaying the contents on the DLNA-corresponding television set 3 and the second display mode of replaying/displaying the contents on the DLNA-noncorresponding television set 5, and this point is a characteristic advantage for the user in the case of employing the portable information processing device 1 according to this embodiment.

Figure 8:
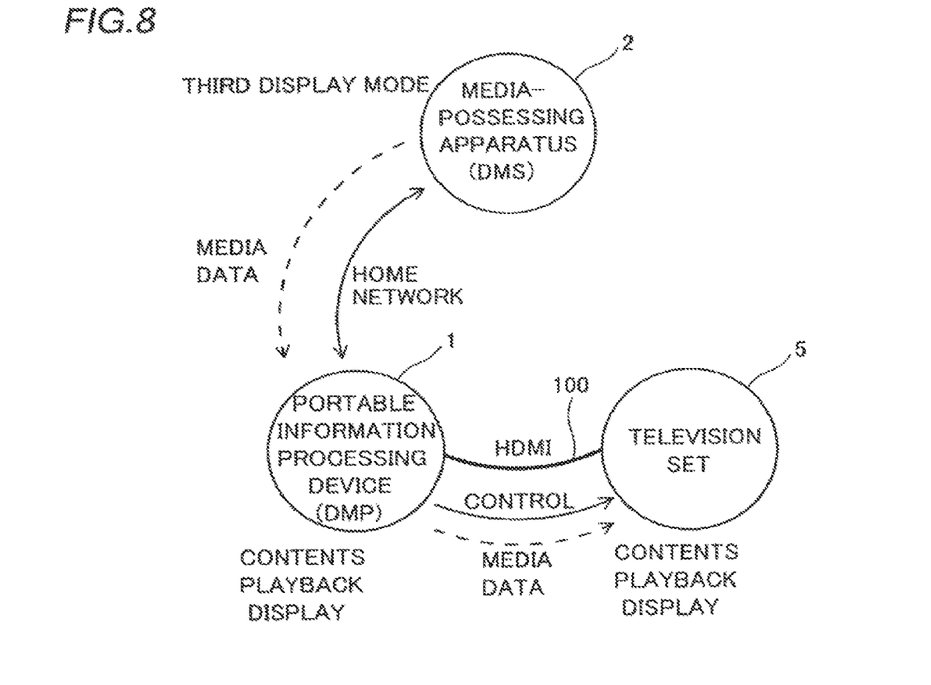
FIG. 8 A diagram for illustrating a display mode (third display mode) of the home network system shown in FIG. 1.

(Third Display Mode According to Mirror Display Function)

As shown in FIG. 8, the third display mode is a case where contents selected by the user are replayed/displayed on both of the portable information processing device 1 and the DLNA-noncorresponding television set 5, dissimilarly to the second display mode. In a case where the user selects media data in the media-possessing apparatus 2 in the third display mode, the portable information processing device 1 acquires the selected media data from the media-possessing apparatus 2 through the home network, transmits the media data to the television set 5 through the HDMI cable 100 while replaying/displaying the acquired media data (contents) on the liquid crystal display portion 10, and controls the television set 5 to replay/display the transmitted media data (contents). In a case where the user selects media data in the portable information processing device 1, the portable information processing device 1 transmits the selected media data to the television set 5 through the HDMI cable 100 while replaying/displaying the selected media data (contents), and controls the television set 5 to replay/display the transmitted media data (contents). In this third display mode, the portable information processing device 1 itself functions as the DMP (digital media player) replaying/displaying the contents.

According to this embodiment, as hereinabove described, the portable information processing device 1 is provided with the HDMI connection portion 15 connectable with the television set 5 noncorresponding to DLNA without through the home network and controls the television set 5, noncorresponding to DLNA, connected to the HDMI connection portion 15 to replay/display media data, whereby the same can control the television set 5 noncorresponding to DLNA to replay/display the media data by connecting the television set 5 noncorresponding to DLNA to the HDMI connection portion 15. Thus, also in the case of employing the television set 5 noncorresponding to the DLNA standard and hence incapable of performing communication according to the DLNA standard and incapable of acquiring media data through the home network, the media data (contents) can be replayed/displayed on the television set 5 noncorresponding to DLNA.

According to this embodiment, as hereinabove described, the portable information processing device 1 is formed to be capable of acquiring media data from the DMS via the home network and controlling the television set 5, noncorresponding to DLNA, connected to the HDMI connection portion 15 to replay/display the acquired media data (contents). Thus, also with respect to the television set 5 noncorresponding to DLNA, the portable information processing device 1 can easily acquire media data from the DMS through the home network and control the television set 5 noncorresponding to DLNA to replay/display the media data (contents).

According to this embodiment, as hereinabove described, the portable information processing device 1 is formed to be capable of controlling the television set 5, noncorresponding to DLNA, connected to the HDMI connection portion 15 to replay/display the acquired media data (contents) and controlling the liquid crystal display 10 to make the display as the DMC. Thus, also in the case of employing the external display (television set 5) noncorresponding to DLNA for replaying/displaying the media data (contents) while controlling the liquid crystal display portion 10 to make the display as the DMC, an operational touch similar to that in the case of employing the portable information processing device 1 as the DMC and controlling the television set 3 corresponding to DLNA to replay/display the media data (contents) can be supplied to the user.

According to this embodiment, as hereinabove described, the portable information processing device 1 is formed to selectably list media data on the liquid crystal display portion 10, while the CPU 18*a* is formed to be capable of controlling the television set 5, noncorresponding to DLNA, connected to the HDMI connection portion 15 to replay/display media data selected by the user from the list. Thus, the user can easily select the media data from among the listed media data to be replayed/displayed on the television set 5 noncorresponding to DLNA.

According to this embodiment, as hereinabove described, the portable information processing device 1 is formed to be capable of acquiring media data from the recording medium such as the SD card 50 or the USB memory connected to itself and controlling the television set 5, noncorresponding to DLNA, connected to the HDMI connection portion 15 to replay/display the acquired media data. Thus, the user can control the television set 5 noncorresponding to DLNA to replay/display the media data (contents) stored in the SD card 50, the USB memory or the like by connecting the SD card 50, the USB memory or the like to the SD card connection portion 14 or the USB connection portions 16.

According to this embodiment, as hereinabove described, the portable information processing device 1 is formed to be capable of acquiring media data from the flash memory 18*b* built in the portable information processing device 1 and controlling the television set 5, noncorresponding to DLNA, connected to the HDMI connection portion 15 to replay/display the acquired media data. Thus, the portable information processing device 1 can control the television set 5 noncorresponding to DLNA to replay/display the media data (contents) stored in the flash memory 18*b*.

According to this embodiment, as hereinabove described, the portable information processing device 1 is formed to be capable of controlling the liquid crystal display portion 10 to replay/display the acquired media data (contents) and controlling the television set 5, noncorresponding to DLNA, connected to the HDMI connection portion 15 to replay/display the same media data (contents) as the media data replayed/displayed by the liquid crystal display portion 10. Thus, the media data (contents) can be simultaneously replayed/displayed on both of the portable information processing device 1 and the television set 5.

According to this embodiment, as hereinabove described, the portable information processing device 1 is formed to be capable of controlling the television set 3 as the DMR to replay/display media data of the DMS while regarding the portable information processing device 1 as the DMC and controlling the liquid crystal display portion 10 to make the display as the DMC. Thus, in the case where the television set 3 corresponding to DLNA is connected to the home network, the user can control the television set 3 to replay/display the media data (contents) in the home network while employing the portable information processing device 1 as the DMC and controlling the liquid crystal display portion 10 to make the display as the DMC.

According to this embodiment, as hereinabove described, the HDMI connection portion 15 is formed to include the HDMI connection portion 15 HDMI-connectable with the television set 5 connected without through the home network. Thus, not only media data but also a control signal etc. can be easily transmitted by HDMI-connecting the HDMI connection portion 15 of the portable information processing device 1 and the television set 5 with each other, whereby the portable information processing device 1 and the television set 5 noncorresponding to DLNA can be easily linked with each other. Further, the portable information processing device 1 and the television set 5 can be connected with each other by employing a single cable, whereby the user can easily connect the portable information processing device 1 and the television set 5 with each other.

According to this embodiment, as hereinabove described, the wireless LAN connection portion 12 is formed to be connectable to the Internet through the router 4 as the corresponding apparatus corresponding to DLNA, while the CPU 18*a* is formed to be capable of acquiring media data on the Internet through the wireless LAN connection portion 12 and controlling the television set 5, noncorresponding to DLNA, connected to the HDMI connection portion 15 to replay/display the acquired media data. Thus, also in a case where the television set 5 noncorresponding to DLNA is not connected to the Internet, the portable information processing device 1 can control the television set 5 noncorresponding to DLNA to replay/display the media data on the Internet through the router 4.

According to this embodiment, as hereinabove described, the CPU 18*a* is formed to control the television set 5 to replay/display acquired media data when controlling the television set 5 to replay/display the acquired media data, in a case where the same is connected to the television set 5 noncorresponding to DLNA through the HDMI connection portion 15. Thus, the user can control the television set 5 to display the acquired media data by merely connecting the television set 5 to the portable information processing device 1 through the HDMI connection portion 15, whereby an operation burden on the user for controlling the television set 5 to display the media data can be reduced.

According to this embodiment, as hereinabove described, the CPU 18*a* is formed to select the television set 5 as the replayer/displayer for the acquired media data on the basis of that the television set 5 noncorresponding to DLNA has been connected through the HDMI connection portion 15. Thus, the television set 5 is automatically selected by the CPU 18*a* as the replayer/displayer for the acquired media data on the basis of that the television set 5 noncorresponding to DLNA has been connected, whereby the user may not select the replayer/displayer, but an operation burden on the user can be reduced.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the DLNA has been shown as an example of the prescribed network standard in the aforementioned embodiment, the present invention is not restricted to this, but a standard other than DLNA may also be employed, so far as the same is a prescribed network standard allowing sharing of media data between corresponding apparatuses connected to a network.

While the example of HDMI-connecting the portable information processing device 1 and the DLNA-noncorresponding television set 5 with each other has been described in the aforementioned embodiment, the present invention is not restricted to this, but is applicable to any connection system other than the HDMI connection, so far as it is possible to output media data from the portable information processing device 1 to the television set 5 without through the home network. Further, the portable information processing device 1 and the DLNA-noncorresponding television set 5 may be connected with each other in a wireless manner without through the home network.

While such an example that the HDMI-connected television set 5 is decided as the replayer/displayer for the media data (contents) in the case where the television set 5 is HDMI-connected to the portable information processing device 1 has been described in the aforementioned embodiment, the present invention is not restricted to this, but the replayer/displayer may be rendered selectable between the HDMI-connected television set 5, the television set 3 connected to the home network etc. also in the case of HDMI-connecting the television set 5. In this case, a structure of accepting a selection instruction from the user by a CPU (control portion) is preferable.

While the example of HDMI-connecting the television set 5 noncorresponding to DLNA to the portable information processing device 1 has been described in the aforementioned embodiment, the present invention is not restricted to this, but the television set 3 corresponding to DLNA may be HDMI-connected to the portable information processing device 1.

While the example of forming the liquid crystal display portion 10 of the portable information processing device 1 by an LCD has been described in the aforementioned embodiment, the present invention is not restricted to this, but the liquid crystal display portion 10 may be formed by a PDP (Plasma Display Panel), organic EL (Electro-Luminescence), an FED (Field Emission Display) or the like.

While the example of employing the television sets as the examples of the "first external display" and the "second external display" has been described in the aforementioned embodiment, the present invention is not restricted to this, but the first and second external displays may simply be apparatuses having replay/display functions such as mere displays or projectors.

While the external memory such as the USB memory or the hard disk and the SD card 50 have been employed as the examples of the "portable recording medium" in the aforementioned embodiment, the present invention is not restricted to this, but a memory stick or another memory card such as a PC card may be employed.

While the example of connecting the portable information processing device 1 to the network through the wireless LAN connection portion 12 has been described in the aforementioned embodiment, the present invention is not restricted to this, but the portable information processing device 1 may be connected to the network through a wired LAN employing a LAN cable or a lamp line.

The invention claimed is:

1. A controller comprising:
a display portion;
a first communication portion communicating with a first external apparatus connectable to a network;
a control portion controlling a content to be replayed by said display portion; and
a second communication portion transmitting said content to a second external apparatus communicating without through said network, wherein
said first communication portion is formed to transmit said content to said first external apparatus connected to said network through said network,
said control portion creates a control signal to control said content transmitted to said second external apparatus, and
said control portion is formed to select said second external apparatus as a displayer of said content on the basis of that said second external apparatus has been connected to said second communication portion,
said control portion is further formed to accept a selection instruction for selecting either said first external apparatus or said second external apparatus as a destination of said content.

2. The controller according to claim 1, wherein
said first communication portion is formed to acquire said content from said network, and
said control portion is formed to control said second external apparatus to replay said content.

3. The controller according to claim 1, wherein
said control portion controls said display portion to display a list of said content when said second communication portion is transmitting said content to said second external apparatus.

4. The controller according to claim 1, wherein
said control portion controls said display portion to display a predetermined operation interface even when said content is being transmitted to either said first external apparatus or said second external apparatus.

5. The controller according to claim 4, wherein
said control portion controls said display portion to display a list of said content even when said content is being transmitted to either said first external apparatus or said second external apparatus.

6. The controller according to claim 1, further comprising a memory portion storing a content, wherein
said control portion is formed to transmit said content from said memory portion and control said second external apparatus connected to said second communication portion to replay the transmitted content.

7. The controller according to claim 1, further comprising a connection portion connectable to a recording medium in which a content is stored, wherein
said control portion is formed to acquire said content from said recording medium and control said second external apparatus connected to said second communication portion to replay said content.

8. The controller according to claim 1, wherein
said control portion is formed to control said display portion to replay said content and control said second external apparatus communicating with said second communication portion to replay said content displayed on said display portion.

9. The controller according to claim 1, wherein
said control portion is formed to control said content to be transmitted to said first external apparatus and control said display portion to display control information about a display of said content.

10. The controller according to claim 1, wherein
said second communication portion is formed to transmit sound data, image data, and said control signal to said second external apparatus.

11. The controller according to claim 1, wherein
said second communication portion is formed to have a wired connection with said second external apparatus.

12. The controller according to claim 1, wherein
said control portion is formed to acquire a content on said network through said first communication portion and control said second external apparatus connected to said second communication portion to replay said content.

13. The controller according to claim 1, wherein
said control portion acquires said content from a server via said network at least through said first communication portion and serves as an operation portion to control said first external apparatus or said second external apparatus to replay said content.

\* \* \* \* \*